United States Patent
Newton et al.

(10) Patent No.: US 8,787,131 B2
(45) Date of Patent: Jul. 22, 2014

(54) FALLBACK MECHANISM FOR DATA REPRODUCTION

(75) Inventors: Philip Steven Newton, Eindhoven (NL); Hendrik Frank Moll, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 842 days.

(21) Appl. No.: 11/816,727

(22) PCT Filed: Feb. 13, 2006

(86) PCT No.: PCT/IB2006/050460
§ 371 (c)(1),
(2), (4) Date: Aug. 21, 2007

(87) PCT Pub. No.: WO2006/090300
PCT Pub. Date: Aug. 31, 2006

(65) Prior Publication Data
US 2008/0186816 A1    Aug. 7, 2008

(30) Foreign Application Priority Data
Feb. 28, 2005  (EP) ..................................... 05101508

(51) Int. Cl.
*G11B 20/10*    (2006.01)

(52) U.S. Cl.
USPC .................. 369/47.44; 369/53.12; 369/275.3; 369/53.45; 369/275.1; 369/47.42; 369/47.43; 369/53.37; 710/74; 725/145; 725/146; 725/39; 725/44; 725/89; 725/134

(58) Field of Classification Search
USPC .......... 369/47.44, 53.12, 275.3, 47.42, 47.43, 369/53.37, 53.45; 725/145, 146; 710/74
See application file for complete search history.

(56) References Cited

U.S. PATENT DOCUMENTS

| | | | | |
|---|---|---|---|---|
| 5,612,933 A * | 3/1997 | Iso et al. | ..................... | 369/44.27 |
| 5,982,724 A * | 11/1999 | Hayashi et al. | .............. | 369/47.3 |
| 6,912,189 B2 * | 6/2005 | Propps et al. | .............. | 369/53.36 |
| 7,327,648 B2 * | 2/2008 | Cookson et al. | ........... | 369/47.39 |
| 7,420,904 B2 * | 9/2008 | Ko | ................ | 369/53.2 |
| 7,447,815 B2 * | 11/2008 | Weaver et al. | .................. | 710/72 |
| 7,764,868 B2 * | 7/2010 | Okada et al. | ................. | 386/241 |
| 2002/0107918 A1 | 8/2002 | Shaffer et al. | | |
| 2002/0112226 A1 | 8/2002 | Brodersen et al. | | |
| 2003/0016921 A1 * | 1/2003 | Paek | .............................. | 385/95 |

(Continued)

FOREIGN PATENT DOCUMENTS

| | | |
|---|---|---|
| EP | 1400969 A1 | 3/2004 |
| EP | 1551027 A1 | 7/2005 |

(Continued)

OTHER PUBLICATIONS

World publication No. WO-2004025651 foreign application to the above US equivalent.*

*Primary Examiner* — Jason Olson
*Assistant Examiner* — Linh N Hoffner

(57) ABSTRACT

Reproduction of digital data using a fallback mechanism is disclosed. The digital data can be reproduced in a first mode and in an at least second mode, the operability of a selected mode is monitored and in a situation of failure, a switching between the mode in which a failure is detected to a mode which is operable can be made, so that least some functionality is ensured. An apparatus is disclosed, the apparatus being operable in a first mode where the digital data is accessed in a first format, and the apparatus being operable in an at least second mode where the digital data is accessed in at least a second format. Also a system, a method, a computer readable code and a data stream are disclosed.

10 Claims, 3 Drawing Sheets

(56) References Cited

U.S. PATENT DOCUMENTS

| | | | |
|---|---|---|---|
| 2004/0202447 A1* | 10/2004 | Kim | 386/46 |
| 2006/0077873 A1* | 4/2006 | Seo et al. | 369/275.1 |
| 2006/0143666 A1* | 6/2006 | Okada et al. | 725/89 |
| 2006/0146660 A1* | 7/2006 | Ikeda et al. | 369/30.13 |

FOREIGN PATENT DOCUMENTS

| | | |
|---|---|---|
| EP | 1553769 A1 | 7/2005 |
| JP | 2004005830 A | 5/2005 |
| JP | 2005515351 A | 5/2005 |
| JP | 2003249057 A | 9/2009 |
| WO | WO2004030356 A1 | 4/2004 |
| WO | WO2004030356 A1 | 4/2004 |
| WO | WO2004068854 A1 | 8/2004 |
| WO | WO2004068854 A1 | 8/2004 |
| WO | 2005036555 A1 | 4/2005 |
| WO | 2005045840 A1 | 5/2005 |

* cited by examiner

FALLBACK MECHANISM FOR DATA REPRODUCTION

FIELD OF THE INVENTION

The invention relates to reproduction of digital data and in particular to digital data which can be reproduced in a first mode and in an at least second mode.

BACKGROUND OF THE INVENTION

The data capacity available on digital media has increased since the market introduction of such media, e.g. the DVD disk has a larger capacity than the CD disk. BD-ROM is the next generation of read-only optical disk standard, the BD disk provides a medium with even larger capacity since it will be possible to obtain a capacity of at least 25 GB on one layer.

The logical format of BD-ROM media defines the application of the disks, and currently work is being done to standardise this logical format (as well as the physical format). The large capacity of a BD disk renders possible the presence of a variety of applications on a single disk. The primary application is foreseen to be high definition TV (HDTV), however also interactivity applications such as web-connectivity and games may be part of the standard.

JAVA will be the enabling technology for the interactivity and BD players will contain a JAVA virtual machine with additional application programming interfaces (APIs) for controlling audio-visual (A/V) playback of the disk.

The use of a fully programmable system for BD-ROM results in a more complex verification and testing. The possible applications are endless, but also the differences between implementations of such a complex programmable platform are large, and some applications may not function properly on all devices. In case an application crashes then it might become impossible to play that disk on that player.

The inventors of the present invention have appreciated that improved means for reproducing data from media comprising digital data in more than one format is of benefit, and has in consequence devised the present invention.

SUMMARY OF THE INVENTION

The present invention seeks to provide an improved way of reproduction of data. Preferably, the invention alleviates, mitigates or eliminates one or more of the above or other disadvantages singly or in any combination.

Accordingly there is provided, in a first aspect, an apparatus for reproducing digital data, the apparatus being operable in a first mode where the digital data is accessed in a first format, and the apparatus being operable in an at least second mode where the digital data is accessed in at least a second format, wherein the first mode or the at least second mode can be selected and wherein if a failure of the selected mode is detected a switching to an operable mode can be made.

The apparatus for reproducing digital data may be a consumer electronic stand-alone type apparatus similar to an optical-disk player, the apparatus may also be an add-on module for adding the functionality of the present invention to an apparatus not provided with this functionality. The apparatus may be suitable for reproduction of high-capacity media such as BD-ROM media where the digital data is accessed from a storage disk, the apparatus may however also support data access from other types of media, such as from hard disk type media, data accessible via the Internet or another connection type. The apparatus may be operable in a first mode and in an at least second mode. A mode may be a mode for providing a set of functionalities, e.g. providing access to movie data and a set of functionalities in connection with showing a movie to a user of the apparatus, providing access to a game and a set of functionalities in connection with playing the game.

Support of two or more modes suffer from the risk that one of the modes may not work, as a result the entire disk may become inoperable. But due to the presence of at least two modes it is possible that in a situation where a failure of a selected mode is detected, a switching to an operable mode can be made.

It is an advantage to be able to switch between a mode in which a failure has been detected to an operable mode since a more robust and stable apparatus for reproducing digital data is provided. Modern electronic apparatuses suffer from the fact that they crash and become inoperable from time to time, be incorporating a fallback mechanism, i.e. a mechanism that ensures at least some functionality in a failure situation, the inconvenience of malfunction or idleness is minimised or even avoided.

The optional features as defined in claim 2 have the advantage that by automatically switching to an operable mode, a user of the apparatus need not be disturbed by the occurrence of a failure.

The optional features as defined in claim 3 have the advantage that by supporting programmable applications an almost endless variety of functionalities may be provided.

The optional features as defined in claim 4 have the advantage that a more stable apparatus may be provided. Programmable applications provide a large potential for a variety of functionalities, programmable applications, however, also require extensive and complex verification and testing. Failure of a programmable application is much more likely than failure of a non-programmable application.

It may be an advantage to provide an apparatus supporting both the features of claim 3 and claim 4.

The optional features as defined in claim 5 have the advantage that a versatile apparatus is provided since it may support a variety of different ways of accessing data.

The optional features as defined in claim 6 have the advantage that a more intelligent apparatus and thereby more user-friendly apparatus may be provided. By storing failure characteristics the inconvenience from a failure detected in a first session may be minimised or even avoided in a second session.

The optional features as defined in claim 7 have the advantage that it may be ensured that a user does not experience inconveniences relating to a known failure, i.e. a failure detected in a previous session.

According to a second aspect of the invention is provided a system for reproducing digital data, the system comprising
  a read section for reading digital data,
  an output section for outputting the digital data,
  a control section for controlling the read section and the output section,
  wherein the control section being operable to support a first mode where the digital data is in a first format, and at least a second mode where the digital data is in an at least a second format, and wherein the control section monitors the operability of the digital data reproduction in a selected mode and if a failure is detected in the selected mode a switching to an operable mode can be made.

The read section may be any type of means for providing data from a data source to the system, such as a disk tray with associated means for reading the disk, it may be a slot for inserting a cable, a wireless receiver, etc. The output section is typically the section which ensures that the data may be provided to an apparatus on which the data may be viewed, e.g. the output section may be the section providing data to a screen. The control section may typically be processing means implemented by software, by firmware or by hardware. The processing means may be part of a general purpose processing means, or a dedicated processing means.

According to a third aspect is provided a method for reproducing digital data, the method being provided in accordance with the first and/or second aspect of the present invention.

According to a fourth aspect is provided a computer readable code for reproducing digital data, the computer readable code being provided in accordance with implementing the third aspect of the present invention.

According to a fifth aspect is provided a data stream for reproducing digital data, wherein the data stream comprises first sections where the data stream conforms to digital data in a first format and at least a second section where the data stream conforms to digital data in an at least second format, wherein the reproducing content of the digital data in the at least second section corresponds to the reproducing content of the digital data in the first section, and wherein at least one second section is inserted in the data stream if a failure of the digital data in the first format is present.

The data stream may be constructed from the digital data in the first and second formats. The data stream may be constructed in real-time based on the digital data in the first and second formats. A processing means in the apparatus according to the first aspect of the invention or the system according to the second aspect of the invention may based on failure characteristics stored in a memory construct the data stream so that a user experiences a continuous and fluent reproduction of the selected digital data.

In general may the various aspects of the invention may be combined and coupled in any way possible within the scope of the invention.

These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF PREFERRED EMBODIMENTS

The present invention may be used in connection with playback from BD-ROM media. In the embodiments described hereafter, an apparatus (or player) reads digital data from a medium and the digital data is reproduced so that one or more users may view the data. In a typical situation of use is the digital data present on a BD-ROM medium, however data may also be provided to the apparatus by other means. The data may be provided internally from an internal source, e.g. such as from a BD-ROM or other storage medium. Another storage medium may include portable hard disks or other types of magnetic and/or semiconductor storage media. The data may, however, also be provided externally from an external source, e.g. through a wire or wireless connection to the Internet, an Intranet or to an external computer, an external storage means, etc. This embodiment is, however, only described for exemplary reasons and should not be taken as a limitation of the scope of the invention. The invention may be used in connection with any suitable device implementation.

Figure 1:
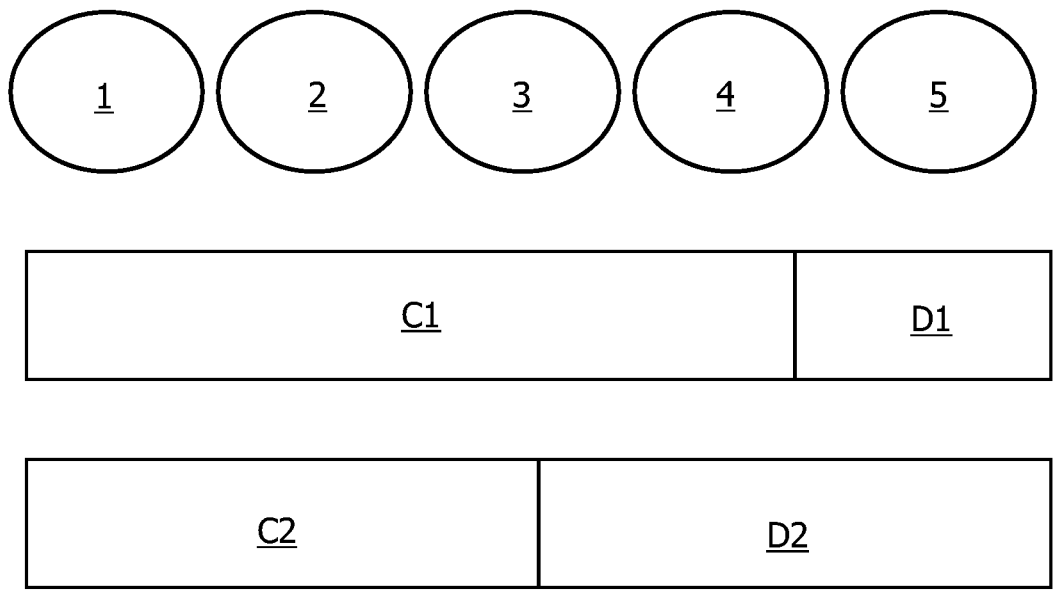
FIG. 1 illustrates an embodiment of a conceptual logical format, FIG. 2 schematically illustrates a movie mode index table, FIG. 3 schematically illustrates a first example of a full mode index table, FIG. 4 schematically illustrates a second example of a full mode index table, FIG. 5 schematically illustrates an updated full mode index table, and FIG. 6 schematically illustrates a flow diagram of an embodiment of the present invention.

An embodiment of the conceptual logical format in which the present invention may be applied is illustrated in FIG. 1. This conceptual logical format is, however, shown only for exemplary reasons and should not be taken as a limitation of the scope of the invention. The invention may be used in connection with any suitable conceptual logical format.

Digital data D1, D2 may be present in a first format D1 and in an at least second format D2. In the following only the situation of two formats is explained, it is however to be understood that more than two formats may be present. The digital data may be present in a movie format D1, such as a format used in connection with high definition TV (HDTV), and in a digital-AV data format D2, e.g. an MPEG format, a DivX format or other standard digital movie formats, an application format such as a JAVA application format or any type of application format, etc. Control systems C1 and C2 are associated with reproduction, or playback of the two formats. The first control system C1 is used when the system is operable in a first mode, whereas the second control system is used when the system is operable in a second mode. The first mode may be a non-programmable mode, it is referred to in the following as the movie mode and it may be designed for movie playback, simple animation and menu graphics. The second mode may be a programmable mode which in the following is referred to as the enhanced or full mode and it may be designed for programmable applications, such as JAVA applications where the reproducing apparatus (the player) is comprising a JAVA virtual machine with additional APIs for controlling the A/V playback of the disk. The logical format supports a number of applications, FIG. 1 illustrates five applications, an example of a set of applications may be: JAVA games 1, JAVA edutainment 2, Access to electronic publications 3, Web access 4 and high definition (HD) movie playback 5. The first mode may provide access only to the move playback 5 (movie mode) where movie data in the first format is reproduced by an apparatus supporting the movie mode. The second mode may provide access to all applications (full mode), where application data for a number of applications is stored in the second format and where the different applications may be reproduced by an apparatus supporting the full mode. A single apparatus may support both the first and the second mode.

The system comprising the two modes is envisioned in connection with bringing the BD standard to the market. The first generation BD-ROM players might only support the movie mode part of the standard (v1.0) these are expected on the market in 2005. The full mode players (v1.1) supporting both JAVA and movie mode are expected on the market at a later stage.

For system supporting the v1.1 JAVA mode, this mode being a programmable mode, one can expect that an application running in such a mode may crash. Experience with modern computer applications shows that applications crash for a number of reasons, playback of pre-recorded digital data, on the other hand, is more stable. Therefore in a situation where a JAVA application crashes a switching to the movie mode can be made. This is elucidated further in the following in connection with a number of embodiments describing situations of use for the present invention.

Having a system supporting two modes on the same medium requires a switching mechanism in the player so that the player, e.g. as a result of a user interaction, can switch between the two modes.

Figure 2:
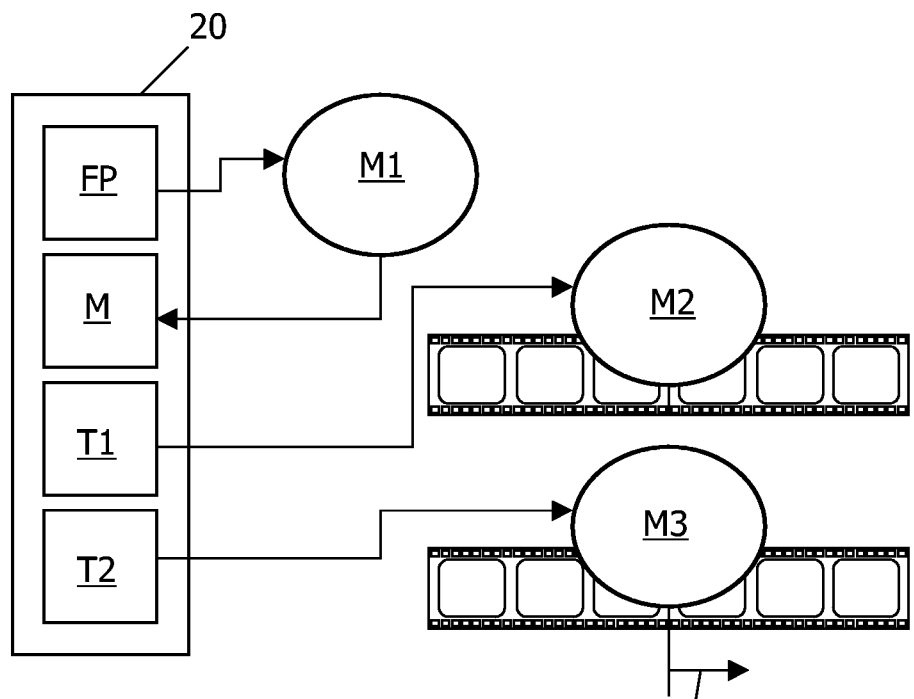
Figure 3:
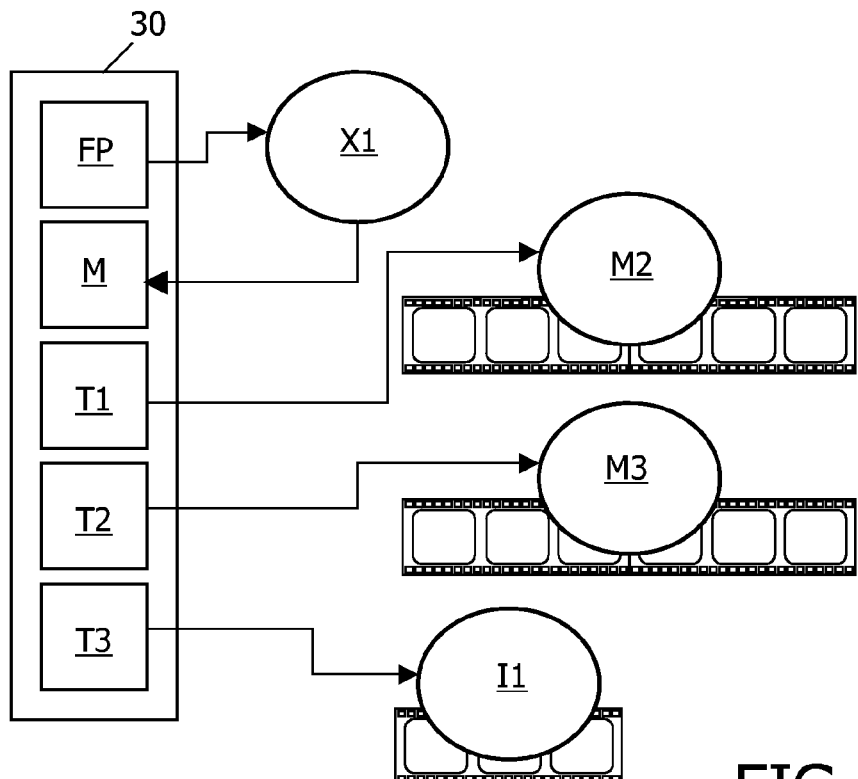
Figure 4:
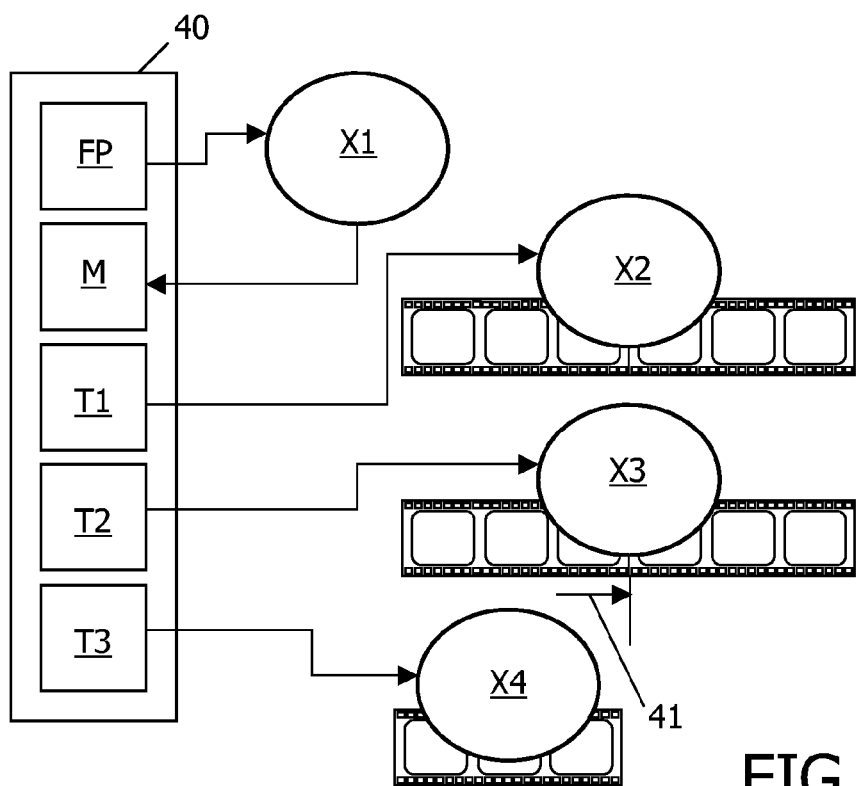

In the following is described an apparatus, i.e. a player, supporting both the v1.0 mode (movie mode) and the v1.1 mode (full mode). FIG. 2 schematically illustrates an index table to be used in the movie mode. FIG. 3 and FIG. 4 illustrate two examples of index tables to be used in the full mode.

A medium comprising data in the first format and second format may also include index tables used in connection with reproducing of the data. An index table is a file located on the disk which holds a list of the titles on the disk and applications associated with those titles. At least two index tables may be present, one relating to the movie mode and at least one relating to the full mode. An index table relating to a movie mode where only entries relating to data in the first format is illustrated in FIG. 2. A first example of an index table relating to a full mode where entries relating to both data in the first format and data relating data in the second format is illustrated in FIG. 3. A second example of an index table relating to a full mode where only entries relating to data in the second format is illustrated in FIG. 4. Settings of the player may decide which of the index tables to use in connection with the first-time use of a new medium.

In an embodiment is a medium provided with data of a movie. The medium comprises, as an example, two versions of a movie (e.g. theatre version and director's cut version). These two versions are present in both the first format, e.g. being a HD movie format and in the second format e.g. being MPEG versions of the movie. In addition is provided two versions of an introduction, one version in the first format and one version in the second format. Furthermore, is provided a game relating to the movie, this game is provided only in the second format, since it requires a programmable mode to be played.

The index table 20 in the movie mode, as illustrated in FIG. 2 contains two movie titles T1, T2 that may be selected for playback. A title is played by executing a so-called movie object M2, M3. The movie objects are simple scripts with a few assembly-language type commands. The player reads the index file upon request, e.g. when a user insert the disk into the player or by other means of providing the data to the player. The index table, as illustrated In FIG. 2, has four entries: FP (first play) which selects the first item the player should start, a top or main menu M providing the overall user frame or user interface to the medium, as well as the two titles T1, T2. When a movie associated with a title finished, the player may automatically resume execution of the main menu.

Full mode players are equipped with a JAVA virtual machine capable of executing JAVA applications, also referred to as Xlets. The index table 30 illustrated in FIG. 3 contains entries T1, T2 which link to movie objects M2, M3 in the first format and entries FP, T3 which link to Xlets X1, I1 in the second format. The index table is for the same disk as in FIG. 2 only now also with an interactive JAVA portion. The third entry T3 is an interactive title, which links to an Xlet I1. The index table as illustrated in FIG. 3 supports reproduction of movie objects in the first format, however also another functionality is supported, namely an interactive object, such as a game associated to the movie. The index table 40 illustrated in FIG. 4 contains only entries which link to Xlets X1-X4.

In a situation where a failure of an Xlet is detected during execution, an application manager in the player ensures that the failure characteristics is registered, i.e. relevant information about the state of the Xlet just before the failure. The failure characteristic may include such information as the playback position of the title. In a specific embodiment may the failure handling be done by calling relevant commands. For example a pause command may be called on the Xlet (a pauseXlet). The pauseXlet command may ensure that the relevant information is registered. Subsequently may a resume command of the same title but in the v1.0 index table be called. This means that instead of the JAVA application the movie mode application will be started. By using the resume operation and the failure characteristics stored in the back-up registers, the movie mode application can be started to playback at the same position as where the failure of the JAVA application was detected.

In FIG. 4 is an illustrated an example where a movie T2 is reproduced by means of an Xlet X3. The Xlet, however, crashed in the middle of the movie, e.g. in the video segment referred to by reference numeral 41. The player stores the current playback values into a backup register. It then calls the same title M3 using the corresponding v1.0 index table as illustrated in FIG. 2 using the values stored in the backup register. Consequently playback is resumed from the same location 21 as where the Xlet had crashed. The switching from the selected full mode in which a failure has occurred to the operable movie mode may be done automatically. The playback may continue without the user noticing it, or with the user noticing only a brief pause.

In a situation where a failure is detected for an Xlet X1 being a first play object FP pointing to the main menu M, may the corresponding first play movie object M1 in the corresponding movie mode be executed. In an other situation where a failure is detected for an Xlet having no corresponding counterpart in the movie mode, e.g. for a game I1, may the first play object X1 be executed and the functionality relating to the Xlet be removed.

Figure 5:
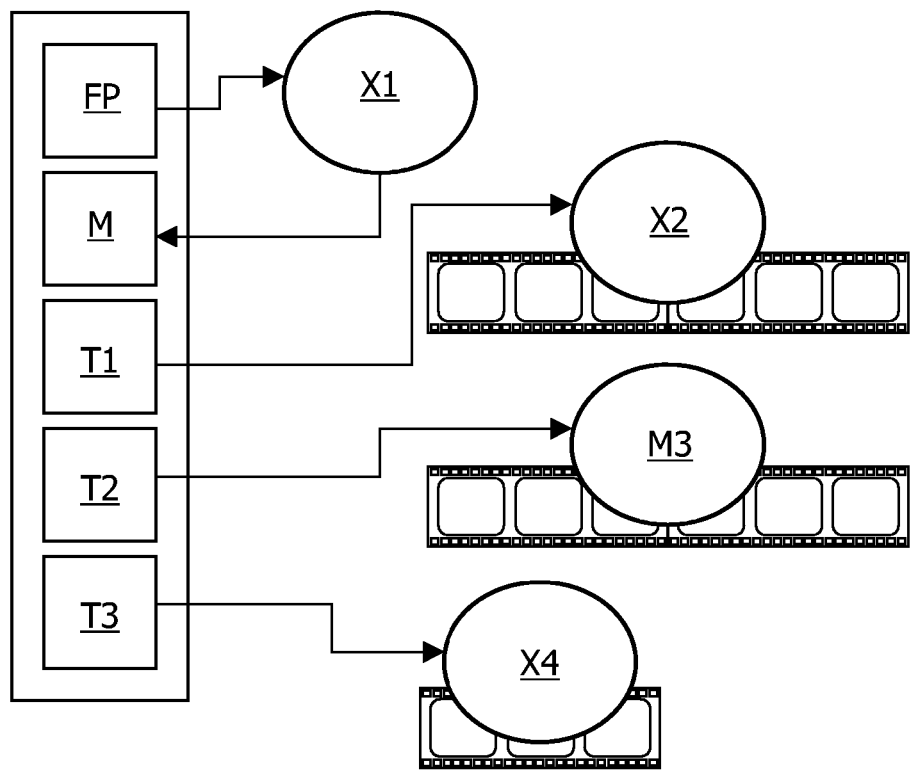

To prevent the title from crashing again when the disk is used a second time the player may generate a new v1.1 index table. This index table can be stored in a memory, e.g. in a local persistent storage of the player. An updated index table is illustrated in FIG. 5 where the Xlet X3 that crashed is replaced by a reference to the corresponding movie object M3 in the corresponding v1.0 index table. The next time the disk is played in the player will the updated index table be used and thus the title is "repaired" permanently. The failure characteristics is thus taken into account so that a reproduction of the data of which a failure was detected in a first session, is made possible in a second session by replacing the digital data in the second format by the digital data in the first format. A session being a situation of use, i.e. a viewing session of a movie.

The apparatus according to the present invention may be an apparatus of the consumer electronic type. The present invention may however also be a system of modules which may provide the functionality of the present invention in any suitable way.

Figure 6:
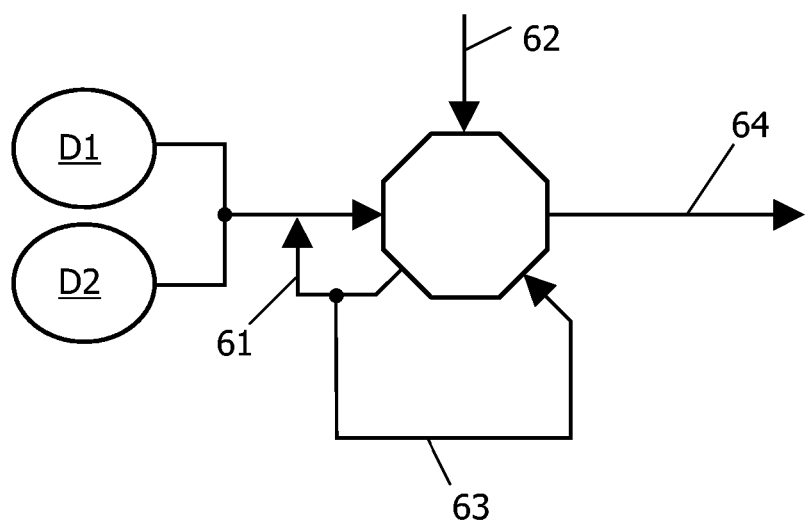

In FIG. 6 is a schematic illustration of at least some aspects of the present invention. Digital data can be accessed in at least two formats D1, D2. A selection 62 is made in order to select which format to reproduce and thereby to select a mode of reproduction. The mode of reproduction is monitored 61 in order to ensure operability of the selected mode, and in case a failure is detected 63, a switching to an operable mode is made. An output of data 64 for reproduction is thereby ensured irrespectively of a failure of the selected mode of reproduction.

Although the present invention has been described in connection with preferred embodiments, it is not intended to be limited to the specific form set forth herein. Rather, the scope of the present invention is limited only by the accompanying claims.

In this section, certain specific details of the disclosed embodiment such as data formats, application types, etc., are set forth for purposes of explanation rather than limitation, so as to provide a clear and thorough understanding of the present invention. However, it should be understood readily by those skilled in this art, that the present invention may be practiced in other embodiments which do not conform exactly to the details set forth herein, without departing significantly from the spirit and scope of this disclosure. Further, in this context, and for the purposes of brevity and clarity, detailed descriptions of well-known apparatus, circuits and methodology have been omitted so as to avoid unnecessary detail and possible confusion.

Reference signs are included in the claims, however the inclusion of the reference signs is only for clarity reasons and should not be construed as limiting the scope of the claims.

The invention claimed is:

1. A system for reproducing digital data, the digital data being present in a first format and in a second format, the system comprising:
   a read section for reading the digital data;
   an output section for outputting the digital data; and
   a control section for controlling the read section and the output section,
   the control section being operable to support a first mode where the digital data is reproduced according to the first format, and at least a second mode where the digital data is reproduced according to the second format,
   wherein the control section monitors operability of the digital data reproduction in a selected mode and switches to an operable mode in response to detecting a failure in the selected mode, and
   wherein in a first session, the control section monitors the operability of a selected mode and upon detection of the failure in the selected mode, the control section stores a failure characteristics in a memory including updating an index table by replacing a reference to an object in a selected format causing the failure by a reference to an object in a different format of the operable mode, and wherein the control section consults the failure characteristics and the updated index table in connection with reproduction of the digital data in a second session in the selected mode using the selected format except where the failure had occured where the different format is used for the reproduction of the digital data in the second session in accordance with the updated index table, wherein the failure characteristics comprises state of the digital data just before the failure.

2. The system as claimed in claim 1, wherein at least one of the modes is supporting programmable applications.

3. The system as claimed in claim 1, wherein at least one of the modes is supporting non-programmable applications.

4. The system as claimed in claim 1, wherein the digital data is internally and/or externally accessible.

5. The system as claimed in claim 1, wherein the failure characteristic is automatically taken into account so that a reproduction of the digital data in the second session automatically replaces the digital data in a format where the failure is detected with a corresponding digital data in another format.

6. The system of claim 1, wherein the selected mode is the second mode and supports programmable applications and the operable mode is the first mode and supports non-programmable applications, and wherein the control section replaces the digital data in the second format by digital data in the first format.

7. A method for reproducing digital data, the digital data being present in a first format and in a second format, the method comprising acts of:
   selecting a reproduction mode from a group consisting of a first mode where the digital data is in the first format, and a second mode wherein the digital data is in the second format;
   reproducing the digital data with the digital data in the selected mode;
   monitoring operability of the digital data reproduction in the selected mode; and
   in response to detecting a failure in the selected mode detected by the monitoring act, switching to an operable mode,
   wherein the switching act comprises storing a failure characteristics in a memory including updating an index table by replacing a reference to an object in a selected format causing the failure by a reference to an object in a different format of the operable mode, and consulting the failure characteristics and the updated index table in connection with a next reproduction of the digital data in the selected mode using the selected format except where the failure had occured where the different format is used for the reproduction of the digital data in accordance with the updated index table, wherein the failure characteristics comprises state of the digital data just before the failure.

8. The method of claim 7, wherein the selected mode is the second mode and supports programmable applications and the operable mode is the first mode and supports non-programmable applications, and wherein the method further comprises the act of replacing the digital data in the second format by digital data in the first format.

9. A system for reproducing digital data, the digital data being present in a first format and in a second format, the system comprising:
   a read section for reading the digital data;
   an output section for outputting the digital data; and
   a control section for controlling the read section and the output section,
   the control section being operable to support a first mode where the digital data is reproducing according to the first format, and at least a second mode where the digital data is reproduced according to the second format,
   wherein the control section monitors the operability of the digital data reproduction in a selected mode and switches to an operable mode in response to detecting a failure in the selected mode, and
   wherein the control section updates an index table referenced by the read section by replacing a reference to an object in a selected format causing the failure by a reference to an object in a different format of the operable mode so that the index table is repaired and allows reproduction of the digital data in the selected mode using the selected format except where the failure had occured where the different format is used for the reproduction of the digital data in accordance with the repaired index table.

10. A method for reproducing digital data, the digital data being present in a first format and in a second format, the method comprising acts of:

selecting a reproduction mode from a group consisting of a first mode where the digital data is in the first format, and a second mode wherein the digital data in in the second format;

reproducing the digital data with the digital data in the selected reproduction mode;

monitoring by a controller the operability of the digital data reproduction in the selected reproduction mode;

in response to detecting a failure in the selected reproduction mode detected by the monitoring act, switching to an operable mode; and updating an index table referenced prior to the reproducing act, wherein the updating act replaces a reference to an object in a selected format causing the failure by a reference to an object in a different format of the operable mode so that the index table is repaired and allows reproduction of the digital data in the selected mode using the selected format except where the failure had occured where the different format is used for the digital data reproduction in accordance with the repaired index table.

* * * * *